(12) United States Patent
Hirano et al.

(10) Patent No.: US 12,715,040 B2
(45) Date of Patent: Aug. 25, 2026

(54) METHOD FOR MANUFACTURING COPPER ALLOY POWDER FOR METAL AM

(71) Applicant: MITSUBISHI MATERIALS CORPORATION, Tokyo (JP)

(72) Inventors: Shingo Hirano, Tokyo (JP); Kiyoyuki Okubo, Tokyo (JP); Satoshi Kumagai, Sakai (JP); Jun Kato, Saitama (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 18/877,925

(22) PCT Filed: Oct. 24, 2023

(86) PCT No.: PCT/JP2023/038393
§ 371 (c)(1),
(2) Date: Dec. 20, 2024

(87) PCT Pub. No.: WO2024/090447
PCT Pub. Date: May 2, 2024

(65) Prior Publication Data
US 2025/0162031 A1 May 22, 2025

(30) Foreign Application Priority Data
Oct. 24, 2022 (JP) ................................ 2022-169920

(51) Int. Cl.
*B22F 9/08* (2006.01)
*B22F 1/05* (2022.01)
(Continued)

(52) U.S. Cl.
CPC ................ *B22F 9/082* (2013.01); *B22F 1/05* (2022.01); *B33Y 70/00* (2014.12); *C22C 1/02* (2013.01);
(Continued)

(58) Field of Classification Search
CPC ..................................... B22F 9/082–2009/089
See application file for complete search history.

(56) References Cited

U.S. PATENT DOCUMENTS 10,646,917 B2 * 5/2020 Mori ........................ B22D 1/00
2011/0123389 A1 * 5/2011 Shindo ................ C23C 14/3414
420/500
(Continued)

FOREIGN PATENT DOCUMENTS

CN 101878078 A 11/2010
CN 105392908 A 3/2016
(Continued)

OTHER PUBLICATIONS

Sadayappan K., et al.; "Copper and Copper Alloy Castings", ASM Handbook, vol. 15, p. 1085-1094 (Year: 2008).*
(Continued)

*Primary Examiner* — Sally A Merkling
*Assistant Examiner* — Austin Pollock
(74) *Attorney, Agent, or Firm* — Troutman Pepper Locke LLP; James E. Armstrong, IV

(57) ABSTRACT

A method for manufacturing a copper alloy powder for a metal AM includes a casting step of manufacturing a copper alloy ingot with a casting apparatus including a molten copper supply unit which melts a copper raw material consisting of high-purity copper having a purity of 99.99 mass % or more to obtain molten copper, an addition unit which adds alloy elements of a copper alloy to the molten copper, and a mold to which the molten copper alloy is supplied, and an atomizing treatment step of powdering the copper alloy ingot by performing melting and decomposing by an atomizing treatment in an inert gas or a vacuum atmosphere using the copper alloy ingot, in which the O concentration of the copper alloy ingot is set to 10 mass ppm
(Continued)

or less, and the H concentration of the copper alloy ingot is set to 5 mass ppm or less.

9 Claims, 4 Drawing Sheets

(51) Int. Cl.
*B33Y 70/00* (2020.01)
*C22C 1/02* (2006.01)
*C22C 9/00* (2006.01)

(52) U.S. Cl.
CPC ............ *C22C 9/00* (2013.01); *B22F 2301/10* (2013.01); *B22F 2304/10* (2013.01); *B22F 2998/10* (2013.01)

(56) References Cited

U.S. PATENT DOCUMENTS

| | | | | |
|---|---|---|---|---|
| 2015/0200033 | A1 | 7/2015 | Sumino | |
| 2016/0160321 | A1* | 6/2016 | Ito | H01R 13/03 420/478 |
| 2016/0318105 | A1* | 11/2016 | Gerking | B22F 9/082 |
| 2021/0178465 | A1 | 6/2021 | Endo et al. | |

FOREIGN PATENT DOCUMENTS

| | | | | | |
|---|---|---|---|---|---|
| CN | 108723375 | A | * | 11/2018 | B22F 9/082 |
| CN | 109014228 | A | * | 12/2018 | |
| CN | 109112346 | A | * | 1/2019 | B22F 1/0048 |
| CN | 109550969 | A | * | 4/2019 | |
| CN | 110218897 | A | * | 9/2019 | B22F 3/04 |
| CN | 110315084 | A | * | 10/2019 | B07B 1/46 |
| CN | 110614377 | A | * | 12/2019 | B22F 9/082 |
| CN | 111069615 | A | * | 4/2020 | B22F 1/0048 |
| CN | 111676386 | A | | 9/2020 | |
| JP | 2006341268 | A | * | 12/2006 | |
| JP | 2011-012301 | A | | 1/2011 | |
| JP | 2011149070 | A | * | 8/2011 | B22F 9/082 |
| JP | 2015-132008 | A | | 7/2015 | |
| JP | 2016-211062 | A | | 12/2016 | |
| JP | 2018-178239 | A | | 11/2018 | |
| JP | 2019-070169 | A | | 5/2019 | |
| JP | 2020-186429 | A | | 11/2020 | |
| SG | 10201404247 | A1 | * | 2/2016 | |
| WO | WO-2011054113 | A1 | * | 5/2011 | B22F 9/082 |

OTHER PUBLICATIONS

Yang G., et al.; "Quality Control: Internal Defects Formation Mechanism of Selective Laser Melting Based on Laser-powder-melt Pool Interaction: A Review"; Chinese Journal of Mechanical Engineering: Additive Manufacturing Frontiers 1 (2022) 100037 ; Sep. 16, 22 (Year: 2022).*

Eurofins; "Multiscale assessment on the quality of metal powder feedstocks for additive manufacturing", https://www.eag.com/app-note/multiscale-assessment-on-the-quality-of-metal-powder-feedstocks-for-additive-manufacturing/; retrieved from internet on Sep. 5, 2025; 2023 (Year: 2023).*

AMFG; "10 of the Biggest Challenges in Scaling Additive Manufacturing for Production in 2020 [Expert Roundup]" "https://amfg.ai/2019/10/08/10-of-the-biggest-challenges-in-scaling-additive-manufacturing-for-production-expert-roundup/", retrieved from internet on Sep. 5, 2025. Oct. 8, 2019 (Year: 2019).*

ASM Handbook; Casting of Copper and Copper Alloys; vol. 15, p. 1026-1048, 2008 (Year: 2008).*

Y. M. Arisoy et al., "Influence of scan strategy and process parameters on microstructure and its optimization in additively manufactured nickel alloy 625 via laser powder bed fusion", The International Journal of Advanced Manufacturing Technology, vol. 90, 2017, pp. 1393-1417. (discussed in the spec).

C. Wallis et al., "Effect of heat treatments on microstructure and properties of CuCrZr produced by laser-powder bed fusion", Materials Science & Engineering A, 744, 2019, pp. 215-223.

Z. Ma et al., "Selective laser melting of Cu—Cr—Zr copper alloy: Parameter optimization, microstructure and mechanical properties", Journal of Alloys and Compounds, 828, 2020, 154350, pp. 1-10.

International Search Report mailed Dec. 5, 2023, issued for PCT/JP2023/038393 and English translation thereof.

Office Action issued in Chinese Patent Application No. CN202380074239.0, mailed Jul. 25, 2025, with English translation.

* cited by examiner

METHOD FOR MANUFACTURING COPPER ALLOY POWDER FOR METAL AM

TECHNICAL FIELD

The present invention relates to a method for manufacturing a copper alloy powder for a metal AM most suitable for a metal additive manufacturing (a metal AM) technique.

Priority is claimed on Japanese Patent Application No. 2022-169920, filed Oct. 24, 2022, the content of which is incorporated herein by reference.

BACKGROUND ART

In recent years, as a method for manufacturing metal components having various three-dimensional shapes, metal AM technologies for forming a product by a metal 3D printer using mainly a powder as a raw material has been put into practical use. As major metal AM technologies using metal powders, a powder bed melting method using an electron beam or laser light (powder bed fusion (PBF)), a binder jetting method, and the like are exemplary examples.

Here, copper alloys have many basic characteristics suitable for industrial applications, such as an electrical conductivity, a heat conductivity, a mechanical characteristic, an abrasion resistance, and a heat resistance, and thus is used as a material for various members. Therefore, in recent years, in various fields, such as outer space and electrical-components applications, attempts have been made to form members having various shapes by using a metal AM using a copper alloy powder, and there is an increasing need for copper and copper alloy components manufactured by metal AM.

For example, Patent Documents 1 and 2 propose a technology for manufacturing an additive manufacturing product by the metal AM using a copper alloy powder.

CITATION LIST

Patent Documents

Patent Document 1:
Japanese Unexamined Patent Application, First Publication No. 2016-211062
Patent Document 2:
Japanese Unexamined Patent Application, First Publication No. 2019-070169

Non-Patent Document

Non-Patent Document 1:
Y. M. Arisoy et. al., "Influence of scan strategy and process parameters on microstructure and its optimization in additively manufactured nickel alloy 625 via laser powder bed fusion", The International Journal of Advanced Manufacturing Technology, Volume 90, p.p. 1393-1417 (2017).

SUMMARY OF INVENTION

Technical Problem

A metal structure, which is formed by the metal AM, is used as some kind of structural member according to various applications. Accordingly, when a void exists in an additive manufacturing product or when a fine structure as a metal material is not uniform, there is a problem in terms of thermomechanical and electrical reliability.

Currently, a forming method most often used for the metal AM is laser PBF, and attempts have also been made to forming copper and a copper alloy by the laser PBF.

Meanwhile, in a case of performing an additive manufacturing by a method of irradiating laser light or an electron beam, a thin powder layer is first formed (a powder bed), and laser or an electron beam is locally irradiated to the powder bed to melt and solidify a material. However, compared to other metal materials, such as iron, titanium, nickel-based materials and the like, in copper and a copper alloy, there are many problems that a melting behavior of a copper alloy powder becomes unstable during a process of the laser PBF, voids easily occurs in an additive manufacturing product, quality of a formed body manufactured by the laser PBF is not stable, productivity is poor, and the like, due to a high reflectivity of copper itself to light in visible and infrared regions and the like. Therefore, it is require to improve quality and productivity of copper and a copper alloy manufactured by the laser PBF.

Currently, the most widely used form of a raw material for the metal AM is a powder. For example, in the metal AM that uses the laser PBF, a melting behavior of the raw powder can be affected by optical absorption characteristics of electromagnetic waves in particles, which is determined by a coupling-interaction between surface layers of each particle in a raw powder and the electromagnetic waves irradiated, and this melting behavior of the raw powder greatly affects productivity of components and quality of components, including a defect density of components. For example, in a metal AM process that uses a powder bed, a thickness of the powder bed formed in a single additive manufacturing process is, for example, approximately several ten μm (Non-Patent Document 1), the raw powder is melted by irradiating a relatively thin powder bed with converged electromagnetic waves, and furthermore, a desired formed structure can be realized through a large number of repetition of additive manufacturing process and subsequent melting and solidification (processes). The absorption characteristics of electromagnetic waves in a solid greatly affect an elementary process in such the additive manufacturing processes using the powder bed. For example, because the absorption characteristics of the electromagnetic waves in a solid are affected by a material composition, it is extremely important to increase uniformity of material composition and a microstructure of the powder for realization of stable quality and high productivity in the entire additive manufacturing product.

In addition, for the copper alloy, as a result of various research and development in the past, a material that realizes a high mechanical strength while maintaining a high electrical conductivity, a material having an excellent heat resistance, and the like have been already developed. Even in the metal AM, there is a social demand for realizing a metal AM component having a desired shape using materials of an existing high-performance copper alloy composition. However, in a case of performing the additive manufacturing process by irradiating the powder bed of the raw material having the existing copper alloy composition with laser light or electron beams, and in a case where there is a lack of a reproducibility of the fine structure related to a raw powder including a composition reproducibility of powder particles in each portion irradiated with laser light or the like, a melting behavior of the powder is not uniform. As a result, there was a risk that this induced structural defects of voids and the like in the additive body or a deterioration of mechanical structures due to the non-uniformity of the metal composition of the additive body occurred.

Such a reproducibility of the fine structure of the raw powder includes a reproducibility of the material composition of the powder, and has been the same problem even in other metal AM methods, such as a binder jetting method. Particularly, in the additive manufacturing processes of the copper alloy, the improvement of the productivity was a major object due to the problems with a variety of raw materials as described above. In a copper alloy powder of the related art for the metal AM, material characteristics suitable for a metal AM process were insufficient, and as a result, defects easily occurred in an additive body manufactured by various additive manufacturing processes, and sufficient productivity could not be realized.

In addition, one factor that causes structural defects in the metal AM body is generation of voids caused by involution of a gas or the like. In a case where the additive manufacturing processes was performed by a PBF method using a copper alloy powder of the related art, a gas was generated due to impurities contained in the copper alloy powder at the time of melting the powder, a molten copper alloy or a solidified copper alloy trapped a gas component, voids were generated in the additive manufacturing product, and there was a risk that a stable high-quality additive manufacturing product could not be manufactured.

The present invention has been made in view of the circumstances described above, and an object thereof is to provide a method for manufacturing a copper alloy powder for the metal AM having a high reproducibility of a fine structure of an additive manufacturing product manufactured by the metal AM and capable of stably manufacturing a high-quality additive manufacturing product with less structural defects, such as voids and the like.

Solution to Problem

In order to solve this problem, the present inventors have conducted intensive studies and found that, in a case of using a powder manufactured from an atomizing treatment step of powdering the copper alloy ingot by performing melting and decomposing by an atomizing treatment in an inert gas or a vacuum atmosphere using a high-purity copper alloy ingot, in which the O concentration and the H concentration are sufficiently reduced, as a raw material, generation of voids in the additive manufacturing product can be significantly suppressed.

Regarding the suppression of voids in a laser PBF process, the reproducibility of the material composition of the entire powder is increased by increasing a purity of a copper alloy powder. That is, because the reproducibility of the powder composition at each portion of the powder bed irradiated with laser is increased, the reproducibility of melting and solidification behaviors of a raw powder due to laser irradiation can be increased and stabilized. Furthermore, because the reproducibility of the powder composition at each portion of the powder bed irradiated with laser is increased, a desorption gas component, such as $H_2O$, which is generated due to O and H in the raw powder, is suppressed, thereby, the generation of voids in the additive manufacturing product can be suppressed.

The present invention has been made based on the findings described above, and a method for manufacturing a copper alloy powder for the metal AM of Aspect 1 of the present invention, which is used for the metal AM, includes a casting step of manufacturing a copper alloy ingot with a casting apparatus including a molten copper supply unit, which melts a copper raw material consisting of high-purity copper having a purity of 99.99 mass % or more to obtain molten copper, an addition unit, which adds alloy elements of a copper alloy to the molten copper in a non-oxidizing atmosphere to obtain a molten copper alloy, and a mold to which the molten copper alloy is supplied; and an atomizing treatment step of powdering the copper alloy ingot by performing melting and decomposing by an atomizing treatment in an inert gas or a vacuum atmosphere using the copper alloy ingot as a raw material, in which the O concentration of the copper alloy ingot is set to 10 mass ppm or less, and the H concentration of the copper alloy ingot is set to 5 mass ppm or less.

According to the method for manufacturing the copper alloy powder for a metal AM of Aspect 1 of the present invention, the O concentration of the copper alloy ingot is set to 10 mass ppm or less, and the H concentration is set to 5 mass ppm or less. Accordingly, by manufacturing the copper alloy powder using this copper alloy ingot as the raw material, it is possible to manufacture a copper alloy powder for the metal AM having a high reproducibility of a microstructure in an additive manufacturing product and being capable of stably manufacturing a high-quality additive manufacturing product with less structural defects such as voids and the like.

According to Aspect 2 of the present invention, in the method for manufacturing the copper alloy powder for the metal AM according to Aspect 1, it is preferable that an S concentration of the copper alloy ingot is set to 15 mass ppm or less.

According to the method for manufacturing the copper alloy powder for the metal AM of Aspect 2 of the present invention, the S concentration of the copper alloy ingot is set to 15 mass ppm or less. Accordingly, it is possible to sufficiently reduce S, which is a component that is easily contained in copper, and by manufacturing the copper alloy powder using this copper alloy ingot as the raw material, it is possible to manufacture a copper alloy powder for the metal AM having a high reproducibility of a fine structure and capable of stably manufacturing a higher-quality additive manufacturing product with less structural defects such as voids and the like.

According to Aspect 3 of the present invention, in the method for manufacturing the copper alloy powder for the metal AM according to Aspect 1 or 2, it is preferable that a total of the O concentration, the H concentration, and an S concentration of the copper alloy ingot is set to 30 mass ppm or less.

According to the method for manufacturing the copper alloy powder for the metal AM of Aspect 3 of the present invention, the total of the O concentration, the H concentration, and the S concentration of the copper alloy ingot is set to 30 mass ppm or less. Accordingly, by manufacturing the copper alloy powder using this copper alloy ingot as the raw material, it is possible to manufacture a copper alloy powder for the metal AM having a high reproducibility of a fine structure and capable of stably manufacturing a higher-quality additive manufacturing product with less structural defects such as voids and the like.

According to Aspect 4 of the present invention, in the method for manufacturing the copper alloy powder for the metal AM according to any one of Aspects 1 to 3, it is preferable that the total amount of the alloy elements in the copper alloy ingot is set to be in a range of 0.01 mass % or more and 50 mass % or less.

According to the method for manufacturing the copper alloy powder for the metal AM of Aspect 4 of the present invention, the total amount of the alloy elements in the copper alloy ingot is set to be in a range of 0.01 mass % or more and 50 mass % or less. Accordingly, it is possible to stably manufacture a copper alloy powder for the metal AM in which the amounts of the alloy elements are uniform.

In addition, since the alloy elements are contained, it is possible to manufacture a copper alloy powder for the metal AM having excellent various characteristics, such as electrical conductivity and heat conductivity.

According to Aspect 5 of the present invention, in the method for manufacturing the copper alloy powder for the metal AM according to any one of Aspects 1 to 4, it is preferable that one or more selected from Cr, Zr, Si, Ni, Mg, Ti, Al, Zn, Ca, Sn, Pb, Fe, Mn, Te, Nb, Co, Sb, Bi, Ag, Ta, W, Mo, and P are contained as the alloy elements.

According to the method for manufacturing the copper alloy powder for the metal AM of Aspect 5 of the present invention, any one or more alloy elements described above are contained as the alloy elements. Accordingly, it is possible to manufacture a copper alloy powder for the metal AM having excellent various characteristics, such as an electrical conductivity and heat conductivity.

According to Aspect 6 of the present invention, in the method for manufacturing the copper alloy powder for the metal AM according to any one of Aspects 1 to 5, it is preferable that, in the casting step, the copper alloy ingot is continuously manufactured with a continuous casting apparatus.

According to the method for manufacturing the copper alloy powder for the metal AM of Aspect 6 of the present invention, the copper alloy ingot is continuously manufactured by the continuous casting apparatus. Accordingly, production efficiency of the copper alloy ingot is excellent. In addition, according to the method for manufacturing the copper alloy powder for the metal AM according to Aspect 6 of the present invention, it is possible to obtain a copper alloy ingot having a stable amount of alloy elements through continuous casting, and it is possible to stably manufacture a copper alloy powder for the metal AM in which the contents of the alloy elements are uniform.

Advantageous Effects of Invention

According to the present invention, it is possible to provide a method for manufacturing a copper alloy powder for the metal AM having a high reproducibility of a fine structure of an additive manufacturing product manufactured by the metal AM and capable of stably manufacturing a high-quality additive manufacturing product with less structural defects, such as voids and the like.

DESCRIPTION OF EMBODIMENTS

Hereinafter, a method for manufacturing a copper alloy powder for the metal AM of an embodiment of the present invention will be described with reference to the accompanying drawings.

The method for manufacturing the copper alloy powder for the metal AM of the present embodiment is for manufacturing a copper alloy powder used for the metal AM. In the present embodiment, a copper alloy powder suitable for the laser PBF method is manufactured.

Figure 1:
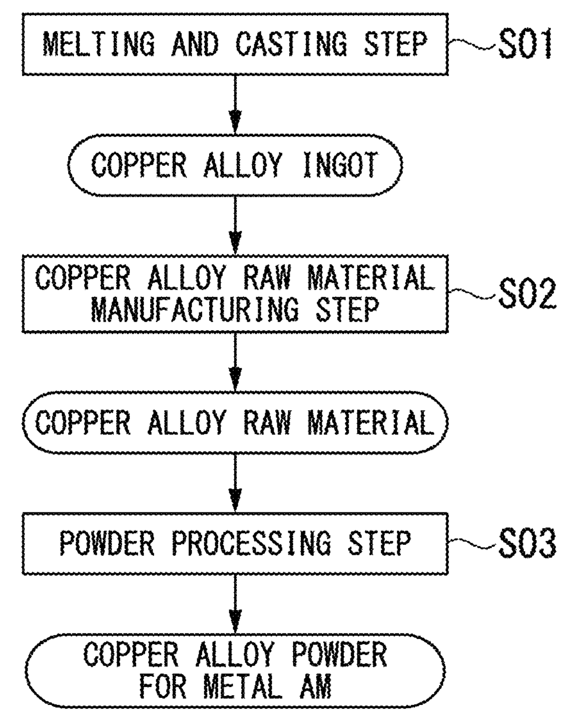
FIG. 1 is a flowchart of a method for manufacturing a copper alloy powder for the metal AM of the present embodiment.

The method for manufacturing the copper alloy powder for the metal AM of the present embodiment will be described with reference to a flowchart of FIG. 1.

The method for manufacturing the copper alloy powder for the metal AM of the present embodiment includes a melting and casting step S01 of obtaining a copper alloy ingot, a copper alloy raw material manufacturing step S02 of processing the obtained copper alloy ingot to a linear rod material to obtain a copper alloy raw material, and a powder processing step S03 of processing the copper alloy raw material to a powder.

(Melting and Casting Step S01)

Figure 2:
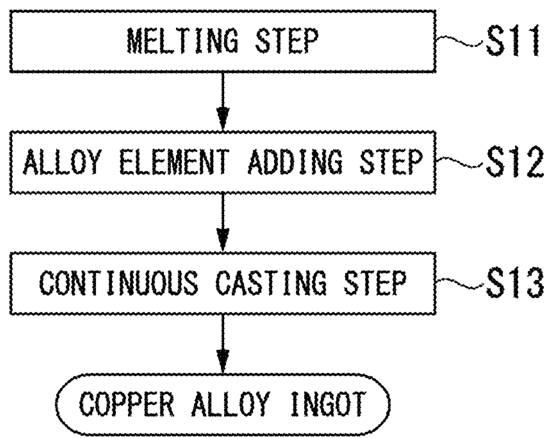
FIG. 2 is a flowchart of a melting and casting step of a method for manufacturing a copper alloy powder for the metal AM of the present embodiment.

First, a copper alloy ingot 1 having a predetermined composition is manufactured. As shown in a flowchart of FIG. 2, the melting and casting step S01 includes a melting step S11, an alloy element adding step S12, and a continuous casting step S13.

Figure 5:
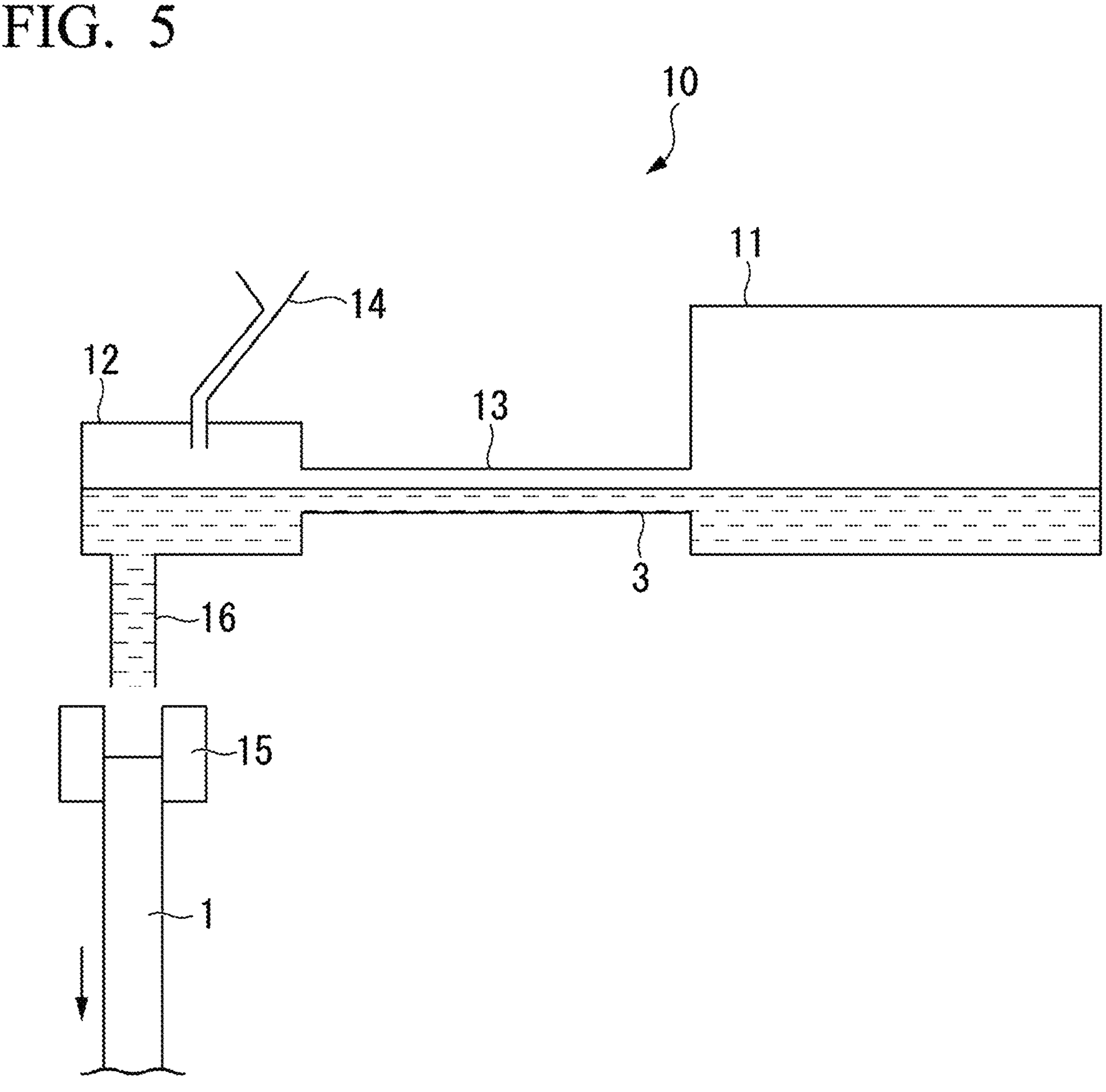
FIG. 5 is a schematic explanatory diagram of a continuous casting apparatus used in a method for manufacturing a copper alloy powder for the metal AM of the present embodiment.

In the present embodiment, the copper alloy ingot 1 is obtained by using a continuous casting apparatus 10 shown in FIG. 5.

The continuous casting apparatus 10 includes a melting furnace 11, a tundish 12 disposed downstream of the melting furnace 11, a connecting pipe 13, which connects the melting furnace 11 and the tundish 12, an addition unit 14, which adds an alloy element to the tundish 12, a continuous casting mold 15 disposed on a downstream side of the tundish 12, and a pouring nozzle 16, which pours a molten copper alloy from the tundish 12 into the continuous casting mold 15.

In the melting furnace 11 of the molten copper supply unit, the copper raw material is melted in a non-oxidizing atmosphere (an inert gas atmosphere or a reducing atmosphere) to obtain molten copper 3 (the melting step S11).

Here, the copper raw material melted in the melting furnace 11 is high-purity copper having a purity of copper of 99.99 mass % or more (for example, high-purity electrolytic copper or oxygen-free copper). The copper raw material to be melted is high-purity copper with 4N grade (99.99 mass %) or more, but is more preferably high-purity copper with 5N grade (99.999 mass %) or more, and even more preferably high-purity copper with 6N (99.9999 mass %) or more. In addition, the obtained molten copper 3 is preferably molten oxygen-free copper.

In the connecting pipe 13, the obtained molten copper 3 is supplied to the tundish 12 in a state where the non-oxidizing atmosphere (the inert gas atmosphere or the reducing atmosphere) is maintained. The connecting pipe 13 is disposed between the melting furnace 11 and the tundish 12, and the molten copper 3 passes through the connecting pipe 13 in the non-oxidizing atmosphere.

In addition, in the tundish 12, the molten copper 3 is held in the non-oxidizing atmosphere (the inert gas atmosphere or the reducing atmosphere).

Since the melting furnace 11, the connecting pipe 13, and the tundish 12 are in the non-oxidizing atmosphere (the inert gas atmosphere or the reducing atmosphere), gas components (O and H) in the molten copper 3 are reduced.

In the tundish 12, an alloy element is added to the molten copper 3 using the addition unit 14 (the alloy element adding step S12).

By adding the alloy element to the molten copper 3 in which the gas component (O and H) is sufficiently reduced, an addition yield of the alloy element is excellent. Accordingly, it is possible to reduce the amount of the alloy element used, and reduce the manufacturing cost of the copper alloy.

In addition, by adding the alloy element to the molten copper 3 flowing the inside of the tundish 12, the alloy element is uniformly melted, and it is possible to continuously manufacture a molten copper alloy having a stable component value.

The obtained molten copper alloy is poured into the continuous casting mold 15 through the pouring nozzle 16, thereby continuously manufacturing the copper alloy ingot 1 (the continuous casting step S13).

Here, in the present embodiment, in the obtained copper alloy ingot 1, the O concentration is set to 10 mass ppm or less and the H concentration is set to 5 mass ppm or less.

The O concentration is more preferably set to 8 mass ppm or less, and the lower limit is not particularly limited, but may be a value not including 0 (or a value more than 0) and may be 0.5 mass ppm. The H concentration is more preferably set to 3 mass ppm or less, and the lower limit is not particularly limited, but may be a value not including 0 (or a value more than 0) and may be 0.2 mass ppm.

In the obtained copper alloy ingot 1, an S concentration is preferably set to 15 mass ppm or less. The S concentration is more preferably set to 11 mass ppm or less, and the lower limit is not particularly limited, but may be a value not including 0 (or a value more than 0) and may be 0.01 mass ppm.

In addition, in the obtained copper alloy ingot 1, the total amount of the impurity element (excluding O, H, and S) other than Cu and the alloy elements is preferably 0.04 mass % or less.

Furthermore, in the obtained copper alloy ingot 1, a total of the O concentration, the H concentration, and the S concentration is preferably set to 30 mass ppm or less. The total of the O concentration, the H concentration, and the S concentration is more preferably 25 mass ppm or less, even more preferably 22 mass ppm or less, and may be 20 mass ppm or less. The lower limit of the total of the O concentration, the H concentration, and the S concentration is not particularly limited, but may be a value not including 0 (or a value more than 0) and may be 0.71 mass ppm.

(Copper Alloy Raw Material Manufacturing Step S02)

Next, the copper alloy ingot 1 obtained in the melting and casting step S01 is processed into a linear rod material to manufacture a copper alloy raw material.

Figure 3:
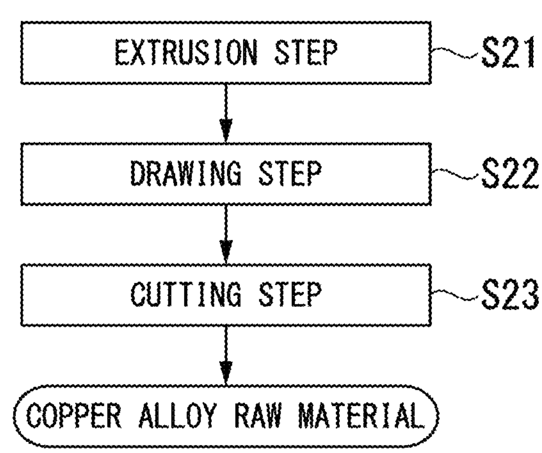
FIG. 3 is a flowchart of a copper alloy raw material manufacturing step of a method for manufacturing a copper alloy powder for the metal AM of the present embodiment.

As shown in FIG. 3, the copper alloy raw material manufacturing step S02 includes an extrusion step S21, a drawing step S22, and a cutting step S23.

In the extrusion step S21, the copper alloy ingot having a circular cross section is heated and subjected to hot extrusion processing to form a rod material having a predetermined diameter.

In the present embodiment, a heating temperature during the hot extrusion processing is preferably set to be in a range of 700° C. or higher and 1,000° C. or lower.

In the drawing step S22, a rod material obtained by the extrusion processing S21 is subjected to drawing processing to obtain a wire rod having predetermined diameter.

The temperature of the drawing processing is not particularly limited, but is preferably set to be in a range of −200° C. to 200° C., at which cold or warm rolling is performed, and particularly preferably room temperature.

In the cutting step S23, the wire rod obtained by the drawing step S22 is cut to have a predetermined length to obtain a copper alloy raw material.

Here, the O concentration of the obtained copper alloy raw material is preferably 10 mass ppm or less and the H concentration thereof is preferably 5 mass ppm or less.

In addition, an S concentration of the obtained copper alloy raw material is preferably 15 mass ppm or less.

In addition, the total amount of the impurity element (excluding O, H, and S) other than Cu and the alloy elements in the obtained copper alloy raw material is preferably 0.04 mass % or less.

(Powder Processing Step S03)

Next, an atomizing treatment is performed using the copper alloy raw material obtained in the copper alloy raw material manufacturing step S02 to manufacturing a copper alloy powder for the metal AM.

Figure 4:
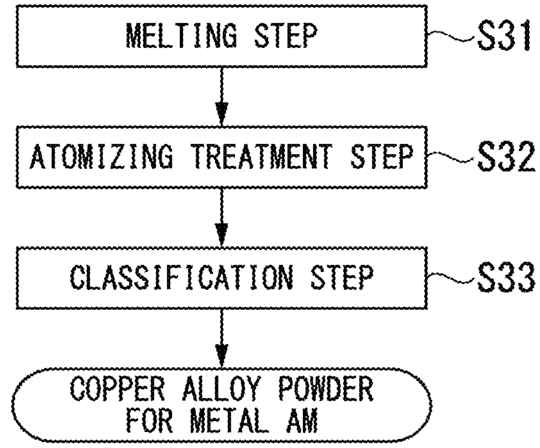
FIG. 4 is a flowchart of an atomizing treatment step of a method for manufacturing a copper alloy powder for the metal AM of the present embodiment.

As shown in FIG. 4, this powder processing step S03 includes a melting step S31, an atomizing treatment step S32, and a classification step S33.

In the melting step S31, the copper alloy raw material is heated and melted to obtain a molten metal. Here, in the present embodiment, an atmosphere at the time of melting is preferably a non-oxidizing atmosphere.

In the atomizing treatment step S32, the molten metal obtained in the melting step S31 is sprayed with a high-pressure gas and liquid droplets of the molten metal are rapidly cooled to manufacture a powder having a spherical shape or a shape similar to the spherical shape. As a gas used in the gas atomizing method, an inert gas, such as argon or nitrogen, can be used. The melting temperature of the copper alloy raw material in the gas atomizing treatment (the melting temperature during the gas atomizing treatment) is preferably a melting point of copper or higher and 1,500° C. or lower. The melting temperature during the gas atomizing treatment may be 1,085° C. or higher and 1,500° C. or lower.

In the classification step S33, the obtained powder is subjected to a classification treatment to obtain a copper alloy powder having a predetermined particle size distribution.

By each step described above, the copper alloy powder for the metal AM is manufactured.

The copper alloy powder for the metal AM manufactured by the method for manufacturing the copper alloy powder for the metal AM of the present embodiment contains various alloy elements as described above.

In the present embodiment, the alloy element refers to an element intentionally added in the method for manufacturing the copper alloy powder for the metal AM of the present embodiment. In the present embodiment, some of the alloy elements may be referred to as active metal elements.

In the copper alloy ingot of the present embodiment, it is preferable to contain one or two or more selected from Cr, Zr, Si, and Ni as the alloy elements.

The alloy elements are not limited to the above components, and it is preferable that one or more selected from Cr, Zr, Si, Ni, Mg, Ti, Al, Zn, Ca, Sn, Pb, Fe, Mn, Te, Nb, Co, Sb, Bi, Ag, Ta, W, Mo, and P are contained as the alloy elements.

In the copper alloy ingot of the present embodiment, it is preferable to contain one or two or more active metal elements as the alloy elements.

As the active metal elements, Cr, Zr, Si, Ni, Mg, Ti, Ni, Al, Zn, Ca, Sn, Pb, Fe, Mn, Te, Nb, and the like are exemplary examples.

In addition, in the copper alloy ingot of the present embodiment, the total amount of the alloy elements is preferably set to be in a range of 0.01 mass % or more and 50 mass % or less. The total amount of the alloy elements is more preferably 0.02 mass % or more and 45 mass % or less, and may be 5 mass % or less.

In the copper alloy powder for the metal AM, the impurity element (excluding O, H, S, and N) other than the alloy elements may be contained in a range that does not affect the properties.

The impurity element (excluding O, H, S, and N) is derived from impurities contained in contamination or a raw material in an extremely small amount during a manufacturing step, and is a component that is unintentionally mixed. In the present embodiment, the impurity element may be inevitable impurities.

Here, the total amount of the impurity element (excluding O, H, S, and N) of the copper alloy powder for the metal AM may be 0.07 mass % or less, may be 0.06 mass % or less, may be 0.05 mass % or less, and is set to preferably 0.04 mass % or less, more preferably 0.03 mass % or less, even more preferably 0.02 mass % or less, and still more preferably 0.01 mass % or less.

Furthermore, in a step performed under a finite pressure, such as the atomizing treatment or the like, the powder may include an atmosphere component, since the atmosphere component is included in an air or in the step. For example, the powder may contain nitrogen as the atmosphere component. In the copper alloy powder for the metal AM of the present embodiment, a nitrogen concentration (an N concentration) is desirably 30 mass ppm, more desirably 20 mass ppm, and even more desirably 10 mass ppm or less. In addition, in the copper alloy powder for the metal AM of the present embodiment, the nitrogen concentration (the N concentration) is still more desirably 5 mass ppm or less. In addition, the lower limit of the N concentration is not particularly limited, but may be a value not including 0 (or a value more than 0).

In a composition of the copper alloy constituting the copper alloy particle 50 of the copper alloy powder for the metal AM, an error of an accuracy of the concentrations is ±10% (excluding O, H, S, and N).

In addition, the copper alloy powder for the metal AM manufactured by the method for manufacturing the copper alloy powder for the metal AM of the present embodiment contains one or two or more alloy elements selected from Cr, Zr, Si, and Ni. The total amount of the alloy elements may be in a range of 0.01 mass % or more and 50 mass % or less, and is more preferably set to be in a range of 0.01 mass % or more and 10 mass % or less, preferably set to a range of 0.01 mass % or more and 5 mass % or less, and may be 0.02 mass % or more. In addition, in the copper alloy powder for the metal AM manufactured according to the present embodiment, the alloy elements are not limited to the components described above, and as the alloy elements (active metal elements), one or more selected from Cr, Zr, Si, Ni, Mg, Ti, Al, Zn, Ca, Sn, Pb, Fe, Mn, Te, Nb, Co, Sb, Bi, and Ag are exemplary examples. Furthermore, since the O concentration of the copper raw material consisting of oxygen-free copper is 10 mass ppm or less and the H concentration is 5 mass ppm or less, the copper alloy powder for the metal AM manufactured by the method for manufacturing the copper alloy powder for the metal AM of the present embodiment has low O concentration and H concentration.

According to the method for manufacturing the copper alloy powder for the metal AM of the present embodiment configured as described above, the O concentration of the copper alloy ingot obtained in the melting and casting step S01 is set to 10 mass ppm or less, and the H concentration is set to 5 mass ppm or less. Accordingly, by manufacturing the copper alloy powder using this copper alloy ingot as the raw material, it is possible to manufacture a copper alloy powder for the metal AM having a high reproducibility of a fine structure and capable of stably manufacturing a high-quality additive manufacturing product with less structural defects such as voids and the like.

In the method for manufacturing the copper alloy powder for the metal AM of the present embodiment, in a case where the S concentration of the copper alloy ingot is set to 15 mass ppm or less, it is possible to sufficiently reduce S, which is a component that is easily contained in copper, and by manufacturing the copper alloy powder using this copper alloy ingot as the raw material, it is possible to manufacture a copper alloy powder for the metal AM having a high reproducibility of a fine structure and capable of stably manufacturing a higher-quality additive manufacturing product with less structural defects such as voids and the like.

In the method for manufacturing the copper alloy powder for the metal AM of the present embodiment, in a case where the total amount of the impurity elements (excluding O, H, and S) other than Cu and the alloy elements in the copper alloy ingot is set to 0.04 mass % or less, the amount of impurity elements is sufficiently reduced, and by manufacturing the copper alloy powder using this copper alloy ingot as the raw material, it is possible to manufacture a copper alloy powder for the metal AM having a high reproducibility of a fine structure and capable of stably manufacturing a higher-quality additive manufacturing product with less structural defects such as voids and the like.

In the method for manufacturing the copper alloy powder for the metal AM of the present embodiment, in a case where the alloy elements are contained, it is possible to manufacture the copper alloy powder for the metal AM, which realizes a copper alloy additive body having excellent various characteristics such as electrical conductivity, heat conductivity, and the like.

In addition, it is possible to obtain a copper alloy ingot having a stable amount of alloy elements by the continuous casting apparatus 1, and it is possible to stably manufacture a copper alloy powder for the metal AM in which the contents of the alloy elements are uniform. In such a state, in which the contents of the alloy elements are uniform in the copper alloy powder for the metal AM, for example, uniform energy absorption is realized over the entire powder bed in an additive manufacturing process of PBF using electron beam or laser light. As a result, it is considered that an additive manufacturing product having a high reproducibility and a high reliability is realized.

In the method for manufacturing the copper alloy powder for the metal AM of the present embodiment, in a case where the copper alloy ingot is continuously manufactured by the continuous casting apparatus 10, it is possible to efficiently manufacture the copper alloy ingot 1.

Hereinabove, the method for manufacturing the copper alloy powder for the metal AM of the embodiment of the present invention has been described, but the present invention is not limited thereto, and modifications can be suitably performed within a range not departing from the technical ideas of the invention.

For example, in the embodiment described above, it has been described that the powder is manufactured by the gas atomizing method, but the invention is not limited thereto, and the copper alloy powder may be manufactured by a water atomizing method, a centrifugal force atomizing method, an inductive coupling plasma method, a plasma atomizing method, or the like.

In addition, the copper alloy powder for the metal AM obtained as described above may be suitably subjected to a heat treatment to stabilize the structure and the like. During this heat treatment, an atmosphere such as an inert gas or a vacuum may be suitably selected.

Furthermore, in the present embodiment, it has been described that the copper alloy powder for the metal AM suitable for the PBF method using laser is manufactured, but the invention is not limited thereto, and it may be a copper alloy powder for the metal AM suitable for other metal AM methods.

In addition, in the present embodiment, it has been described that the copper alloy ingot is manufactured using the continuous casting apparatus shown in FIG. 5, but the invention is not limited thereto, and other casting apparatuses may be used.

Figure 6:
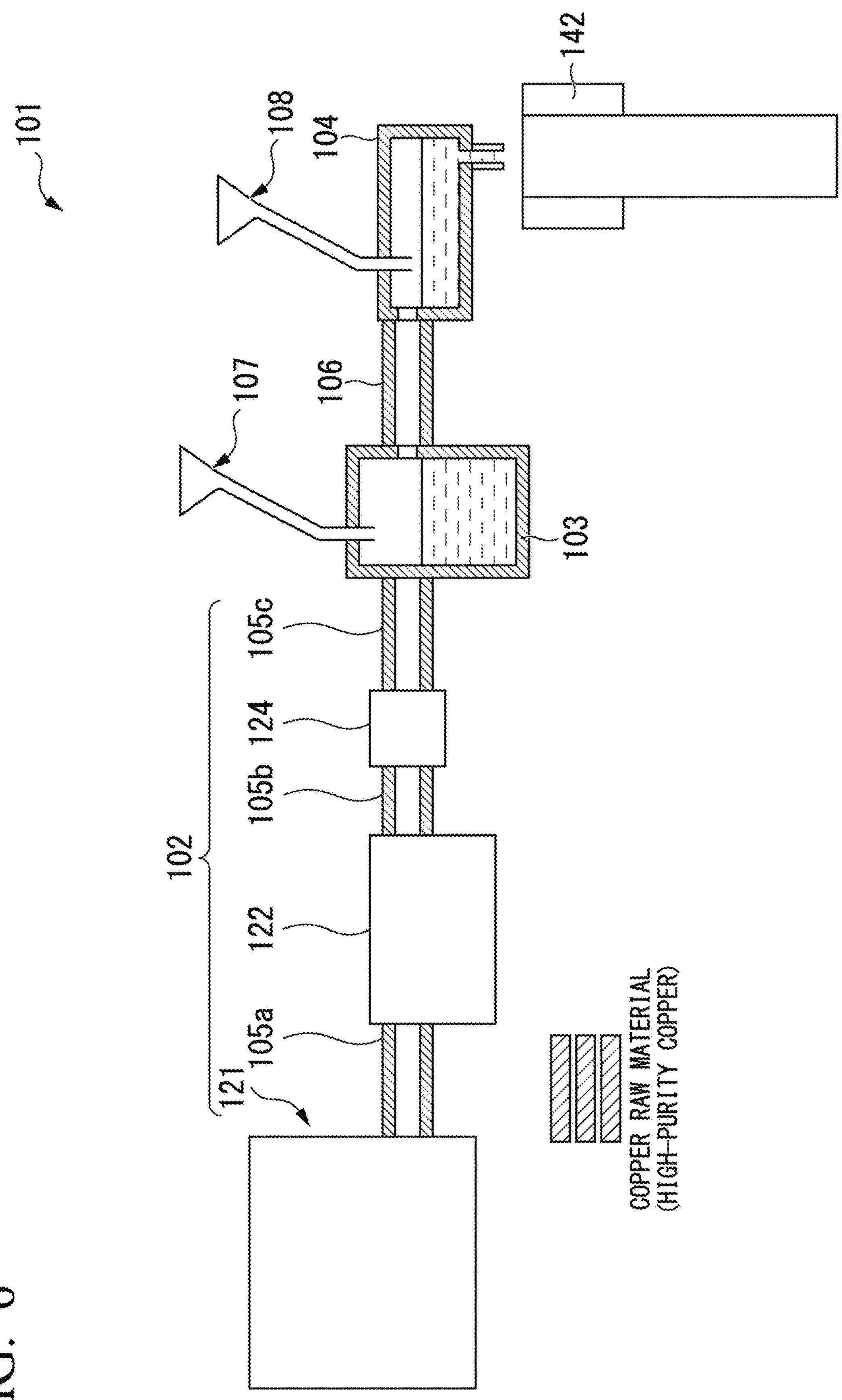
FIG. 6 is a schematic explanatory diagram of another continuous casting apparatus used in a method for manufacturing a copper alloy powder for the metal AM of the present embodiment.

For example, a continuous casting apparatus 101 shown in FIG. 6 may be used. The continuous casting apparatus 101 includes an oxygen-free copper supply means (a molten copper supply unit) 102 disposed at an uppermost stream portion, a heating furnace 103 disposed downstream thereof, a tundish 104, which is disposed downstream of the heating furnace 103 and to which molten copper is supplied, molten metal supply paths 105*a*, 105*b*, and 105*c* connecting the oxygen-free copper supply means 102 and the heating furnace 103, a pipe 106 connecting the heating furnace 103 and the tundish 104, an addition means (addition units) 107 and 108 for adding the alloy element in a non-oxidizing atmosphere, and a continuous casting mold 142. The inside of each of the oxygen-free copper supply means 102, the heating furnace 103, the tundish 104, the molten metal supply paths 105*a*, 105*b*, and 105*c*, and the pipe 106 is set to the non-oxidizing atmosphere.

The oxygen-free copper supply means 102 is configured with a melting furnace 121 for melting a copper raw material, a holding furnace 122 for temporarily holding molten copper obtained by being melted in the melting furnace 121, a degassing treatment device 124 for removing oxygen and hydrogen in the molten copper, and the molten metal supply paths 105*a*, 105*b*, and 105*c* connecting these.

The degassing treatment device 124 includes a gas bubbling device as a stirring means such that the molten copper is stirred in the inside thereof, and, for example, bubbling or the like due to an inert gas is performed, to remove oxygen and hydrogen from the molten copper.

The inside of the molten metal supply paths 105*a*, 105*b*, and 105*c* is set to the non-oxidizing atmosphere in order to prevent the molten copper and the molten oxygen-free copper from being oxidized. The non-oxidizing atmosphere is formed, for example, by blowing an inert gas such as a mixed gas of nitrogen and carbon monoxide or argon into the molten metal supply paths.

The addition means for adding an alloy element includes a first addition means 107 disposed in the heating furnace 103 and a second addition means 108 disposed in the tundish 104.

When the alloy element is continuously or intermittently charged from the first addition means 107 provided in the heating furnace 103, the alloy element is added into the molten oxygen-free copper stored in the heating furnace 103. Here, the molten oxygen-free copper stored in a storage unit is heated by a high-frequency induction coil, and melting of the added alloy element is promoted.

In addition, when the alloy element is continuously or intermittently charged from the second addition means 108 provided in the tundish 104, the alloy element is added into the molten oxygen-free copper flowing in the tundish 104. Here, since the molten oxygen-free copper flowing in the tundish 104 is heated in the heating furnace 103 to have a high temperature and flows in the tundish 104, the melting of the added alloying element is promoted.

EXAMPLES

A confirmation experiment was performed as follows to confirm effects of the present invention.

Examples of the Present Invention

First, an ingot of C18000 having a composition shown in Table 1 was manufactured using a copper raw material consisting of high-purity copper of 4N grade by the manufacturing method described in the embodiment.

The impurities shown in Table 1 are impurity elements (excluding O, H, and S).

Next, by using the manufactured ingot of C18000 as a raw material, a copper alloy powder for the metal AM having a composition shown in Table 2 was manufactured by a gas atomizing method using an argon gas, and sieved by a particle size suitable for a powder bed of the metal AM. The melting temperature during the gas atomizing treatment was performed under a condition of 1,300° C.

As a result of measuring a particle diameter distribution of the copper alloy powder for the metal AM of the example of the present invention using MT3300EXII manufactured by Microtrac Co., Ltd., and a particle size distribution in which a 10% cumulative particle diameter based on a volume was 16 μm, a 50% cumulative particle diameter was 28 μm, a 90% cumulative particle diameter was 45 μm was obtained.

A small piece of an additive manufacturing product was manufactured using the copper alloy powder for the metal AM of the example of the present invention under a condition of an energy density of 13 J/mm$^2$ by using a commercially available laser PBF apparatus.

Example of Related Art

As an example of the related art, a commercially available C18000 powder for the metal AM shown in Table 2 was prepared.

As a result of measuring a particle diameter distribution of the C18000 powder for the metal AM of the example of the related art using MT3300EXII manufactured by Microtrac Co., Ltd., and a particle size distribution in which a 10% cumulative particle diameter based on a volume was 13 μm, a 50% cumulative particle diameter was 33 μm, a 90% cumulative particle diameter was 57 μm was obtained.

A small piece of an additive manufacturing product was manufactured to have a laminate thickness using the C18000 powder for the metal AM of the example of the related art under the same additive condition as in the example of the present invention by using a commercially available laser PBF apparatus.

(Composition of Ingot and Copper Alloy Powder for the Metal AM)

In the ingot shown in Table 1, the copper alloy powder for the metal AM of the example of the present invention, and a copper alloy powder for the metal AM of the example of the related art, the O concentration was obtained by an inert gas melting-infrared absorption method, the H concentration was obtained by an inert gas melting-heat conductivity method, and the S concentration was obtained by combustion-infrared absorption method. In addition, concentrations of components other than these substances excluding copper were obtained by combining fluorescent X-ray spectrometry, glow discharge mass spectrometry, and inductively coupled plasma mass spectrometry.

Results are shown in Table 2. The impurities shown in Table 2 are impurity elements (excluding O, H, S, and N).

(Additive Manufacturing Product Density)

A density of the additive manufacturing product was evaluated from a cross section of the additive manufacturing product, and an area occupied by voids observed on the cross section of the additive manufacturing product. In the present specification, this density is defined as an additive manufacturing product density.

In the evaluation of the additive manufacturing product density, a cross-sectional area to be measured is defined in the cross section of the additive manufacturing product (this is referred to as an evaluation cross-sectional area which is 3.4 mm square), portions of voids inside the measurement cross-sectional area were confirmed, and an occupied area of the voids in the evaluation cross-sectional area was calculated. (Evaluation cross-sectional area–void occupied area)/evaluation cross-sectional area was defined as the additive manufacturing product density. An evaluation result of the additive manufacturing product density is shown in Table 2.

TABLE 1

| | Component composition (mass ratio) | | | | |
|---|---|---|---|---|---|
| | Cu and alloy elements | O (ppm) | H (ppm) | S (ppm) | Impurities (%) |
| Copper alloy ingot | Balance | <10 | <5 | <10 | <0.02 |

TABLE 2

| | Component composition of copper alloy powder (mass ratio) | | | | | Additive manufacturing product Additive manufacturing product |
|---|---|---|---|---|---|---|
| | Cu and alloy elements | O (ppm) | H (ppm) | S (ppm) | Impurities (%) | density (%) |
| Example of present invention | Balance | 100 | <10 | <10 | 0.02 | 99.3 |
| Example of related art | Balance | 700 | 40 | 60 | 0.09 | 97.3 |

As shown in Table 2, it was confirmed that the additive manufacturing product density reached 99.3% by subjecting the additive manufacturing processes using the copper alloy powder for the metal AM of the example of the present invention. On the other hand, in a case where the C18000 powder for the metal AM of the example of the related art was used, it was confirmed that the additive manufacturing product density was 97.3% which is a density with a problem in actual use.

From the above results, it was confirmed that, by using the copper alloy powder for the metal AM manufactured by the method for manufacturing the copper alloy powder for the metal AM of the present invention, it is possible to manufacture an additive manufacturing product having a sufficiently high density with less voids.

Although the O concentration of the copper alloy powder for the metal AM of the example of the present invention is higher than the O concentration of the ingot in Table 1, the original copper alloy ingot has high purity. Accordingly, it is possible to suppress a degree of an increase in excess O concentration in a subsequent step, and it is possible to contribute to the improvement of the reproducibility of the fine structure of the additive manufacturing product.

According to the present invention, it was confirmed that it is possible to provide a method for manufacturing a copper alloy powder for the metal AM having a high reproducibility of a fine structure of an additive manufacturing product manufactured by the metal AM and capable of stably manufacturing a high-quality additive manufacturing product with less structural defects such as voids and the like.

REFERENCE SIGNS LIST

S14: Continuous casting step

S32: Atomizing treatment step

The invention claimed is:

1. A method for manufacturing a copper alloy powder for a metal additive manufacturing, the method comprising:

a casting step of manufacturing a copper alloy ingot with a continuous casting apparatus including a melting furnace, which melts a copper raw material consisting of high-purity copper having a purity of 99.99 mass % or more to obtain molten copper, a tundish, which hold the molten copper, a connecting pipe, which connects the melting furnace and the tundish to supply the molten copper to the tundish, an addition unit, which adds alloy elements of a copper alloy to the molten copper in the tundish to obtain a molten copper alloy, and a continuous casting mold to which the molten copper alloy is supplied; and an atomizing treatment step of powdering the copper alloy ingot by performing melting and decomposing by an atomizing treatment in an inert gas or a vacuum atmosphere using the copper alloy ingot as a raw material, wherein in the casting step, the copper alloy ingot is continuously manufactured with a continuous casting apparatus, in the casting step, the melting furnace, the connecting pipe, and the tundish are in a non-oxidizing atmosphere, an O concentration of the copper alloy ingot is set to 8 mass ppm or less, and an H concentration of the copper alloy ingot is set to 3 mass ppm or less, and an S concentration of the copper alloy ingot is set to 15 mass ppm or less, a total of the O concentration, the H concentration, and an S concentration of the copper alloy ingot is set to 20 mass ppm or less, in the copper alloy ingot, a total amount of an impurity element (excluding O, H, and S) other than Cu and the alloy elements is 0.04 mass % or less, and in the copper alloy powder obtained by the atomizing treatment step, a total amount of an impurity element (excluding O, H, S and N) other than the alloy elements is 0.07 mass % or less.

2. The method for manufacturing a copper alloy powder for the metal additive manufacturing according to claim 1, wherein a total amount of the alloy elements in the copper alloy ingot is set to be in a range of 0.01 mass % or more and 50 mass % or less.

3. The method for manufacturing a copper alloy powder for the metal additive manufacturing according to claim 1, wherein one or more selected from Cr, Zr, Si, Ni, Mg, Ti, Al, Zn, Ca, Sn, Pb, Fe, Mn, Te, Nb, Co, Sb, Bi, Ag, Ta, W, Mo, and P are contained as the alloy elements.

4. The method for manufacturing a copper alloy powder for the metal additive manufacturing according to claim 1, wherein in the copper alloy powder, a nitrogen concentration is 30 mass ppm or less.

5. The method for manufacturing a copper alloy powder for the metal additive manufacturing according to claim 1, wherein in the copper alloy powder, an S concentration is less than 10 mass ppm.

6. A method for manufacturing a copper alloy powder for a metal additive manufacturing, the method comprising:

a casting step of manufacturing a copper alloy ingot with a casting apparatus including a melting furnace, which melts a copper raw material consisting of high-purity copper having a purity of 99.99 mass % or more to obtain molten copper, a tundish, which hold the molten copper, a connecting pipe, which connects the melting furnace and the tundish to supply the molten copper to the tundish, an addition unit, which adds alloy elements of a copper alloy to the molten copper in the tundish to obtain a molten copper alloy, and a mold to which the molten copper alloy is supplied; and an atomizing treatment step of powdering the copper alloy ingot by performing melting and decomposing by an atomizing treatment using an inert gas and using the copper alloy ingot as a raw material, wherein, in the casting step, the melting furnace, the connecting pipe, and the tundish are in a non-oxidizing atmosphere, the atomizing treatment step is performed in an inert gas atmosphere or a vacuum atmosphere, an O concentration of the copper alloy ingot is set to 8 mass ppm or less, and an H concentration of the copper alloy ingot is set to 3 mass ppm or less, and an S concentration of the copper alloy ingot is set to 15 mass ppm or less, a total of the O concentration, the H concentration, and an S concentration of the copper alloy ingot is set to 20 mass ppm or less, in the copper alloy ingot, a total amount of an impurity element (excluding O, H, and S) other than Cu and the alloy elements is 0.04 mass % or less, in the copper alloy powder obtained by the atomizing treatment step, a total amount of an impurity element (excluding O, H, S and N) other than the alloy elements is 0.07 mass % or less.

7. The method for manufacturing a copper alloy powder for the metal additive manufacturing according to claim 6, wherein one or more selected from Cr, Zr, Si, Ni, Mg, Ti, Al, Zn, Ca, Sn, Pb, Fe, Mn, Te, Nb, Co, Sb, Bi, Ag, Ta, W, Mo, and P are contained as the alloy elements.

8. The method for manufacturing a copper alloy powder for the metal additive manufacturing according to claim 6, wherein a total amount of the alloy elements in the copper alloy ingot is set to be in a range of 0.01 mass % or more and 5 mass % or less.

9. The method for manufacturing a copper alloy powder for the metal additive manufacturing according to claim 6, wherein the atomizing treatment is performed by a gas atomizing method or a plasma atomizing method.

* * * * *